United States Patent [19]
Matsuguchi et al.

[11] Patent Number: 4,746,556
[45] Date of Patent: May 24, 1988

[54] EASILY BREAKABLE STICKING MATERIAL

[75] Inventors: Tadashi Matsuguchi, Suita; Noboru Matsuguchi, Ashiya, both of Japan

[73] Assignee: Daimatsu Kagaku Kogyo Co., Ltd., Osaka, Japan

[21] Appl. No.: 840,761

[22] Filed: Mar. 18, 1986

[30] Foreign Application Priority Data

Mar. 28, 1985 [JP] Japan .................. 60-67293
Jun. 28, 1985 [JP] Japan .................. 60-143537

[51] Int. Cl.⁴ ............................................. A61F 13/02
[52] U.S. Cl. ........................................ 428/40; 428/41; 428/42; 428/916
[58] Field of Search ................. 428/40, 916, 41, 42

[56] References Cited

U.S. PATENT DOCUMENTS

| 3,664,910 | 5/1972 | Hollie | 161/147 |
| 4,057,919 | 11/1977 | Gaveh et al. | 40/2.2 |
| 4,121,003 | 10/1978 | Williams | 428/40 |
| 4,184,701 | 1/1980 | Franklin et al. | 283/9 R |
| 4,514,248 | 4/1985 | Cummings | 156/268 |
| 4,521,467 | 6/1985 | Berger | 428/35 |
| 4,544,590 | 10/1985 | Egan | 428/40 |
| 4,557,505 | 12/1985 | Schaefer et al. | 283/81 |
| 4,577,205 | 3/1986 | Shibata et al. | 346/204 |
| 4,604,153 | 8/1986 | Melbye | 156/235 |
| 4,608,288 | 8/1986 | Spindler | 428/78 |
| 4,621,442 | 11/1986 | Mack | 40/2 R |

FOREIGN PATENT DOCUMENTS 0043552 1/1982 European Pat. Off. .
0028776 2/1982 Japan .

Primary Examiner—John E. Kittle
Assistant Examiner—Patrick J. Ryan
Attorney, Agent, or Firm—Birch, Stewart, Kolasch & Birch

[57] ABSTRACT

An easily breakable sticking material comprises a surface layer, an easily breakable layer laminated on one main surface of the above-mentioned surface layer, a first peel-off layer facilitating peeling of the above-mentioned surface layer off the easily breakable layer, a second peel-off layer formed on a part of the main surface of the above-mentioned easily breakable layer, a covering layer formed on the second peel-off layer side main surface of the above-mentioned easily breakable layer, and an adhesive layer formed on the main surface of the above-mentioned covering layer.

When the surface layer is peeled off, only the easily breakable layer where the second layer is formed is peeled off the covering layer. Accordingly, the easily breakable layer is peeled off and separated from the other parts and cannot adhere again as in the original state.

23 Claims, 6 Drawing Sheets

EASILY BREAKABLE STICKING MATERIAL

BACKGROUND OF THE INVENTION

1. Field of the Invention

The present invention relates to an easily breakable sticking material wherein an under breakable layer is easily broken when a surface layer is peeled off by the hand, and specifically relates to a breakable sticking material suitable for a label for preventing re-sticking or the like which is stuck on a price tag or an opening part of a container.

2. Description of the Prior Arts

Conventionally, labels for preventing re-sticking used for price tags or the like have been known wherein a proper line of sewing machine holes or the like is formed in advance on the surface base material, and for example, when it is intended to be peeled off at a shop front or the like to be replaced with another price tag, it is separated and broken on the line of sewing machine holes or the like and thereby this dishonest of peeling can be detected at a glance.

On the other hand, a sticking paper which is stuck on an opening part of a container to indicate the not-opened state can be easily peeled off, for example, by taking up a commodity placed in a show case of the shop front depending upon the material of the opening part of the package and the method of surface treatment thereof, and then a foreign substance or the like can be mixed into the package and thereafter the thicker can be stuck again so that this peel-off cannot be found, and therefore just looking at the sticking paper from the outside cannot detect whether or not the package has already been opened. For this reason, the content of the package might be changed before sale. For example, a cake in the package might be mixed with a toxic substance.

Then, recently, adhesive labels which can indicate or provide a trace of peeling-off after sticking have been put widely on the market.

This adhesive label comprises a film, and a silicon layer is formed on a part of the back surface of this film, and then an evaporation layer whereon a metal is evaporated is formed on the surface of the silicon layer. Accordingly, a part of this evaporation layer is not formed directly on the film due to intervention of the silicon layer. Furthermore, a pressure-sensitive adhesive layer is formed on the surface of this evaporation layer, and a release sheet is stuck temporarily on this pressure-sensitive adhesive layer.

This adhesive label is stuck in a manner that the release sheet is separated and then the exposed surface of the adhesive coated layer is pressed onto the opening part of the package (not illustrated). Then, when the adhesive label stuck on the opening part is peeled off, only the part of the evaporation film which is not evaporated directly on the film base material by means of the peel-off agent coated layer remains intact while stuck to the opening part by the adhesive coated film. Furthermore, if the opening part is opened, the evaporation film remaining there while stuck is cut or torn, and thereby the opened state can be detected.

SUMMARY OF THE INVENTION

However, in such an adhesive label, when the film is peeled off, part of the evaporation film is difficult to remain on the adhesive coated film, being peeled off while adhering intact to the film surface, and thereby forming of characters or the like by means of the remaining evaporation film cannot be made easily. In addition, when the film base material is peeled off, a part of the adhesive coated layer remains on the stuck part of the material whereto the label is to be stuck, and the exposed surface of the adhesive coated layer is sticky and the dust adheres thereto. Thus, this adhesive label has a disadvantage as described above and also has a sanitary problem.

Therefore, the principal object of the present invention is to provide a sticking material such that any peeling-off after sticking can be detected and no adhesive appears on the peeled-off surface, and thereby the surface is not sticky.

The sticking material is formed in a manner that the adhesive force between a first peel-off layer and a breakable layer is larger than that between a second peel-off layer and a covering layer, and the second peel-off layer is formed on the main surface of the breakable layer with a part thereof lacking, and therefore the adhesive force of each part of the breakable sticking material stuck on the material whereto the label is to be stuck differs between the parts where the second peel-off layer is formed and not formed, and when the surface member of the surface is peeled off, the breakable layer is broken at the boundary between the part where the second peel-off layer is formed and the part where it is lacking, and the breakable layer and the covering layer of the part where the second peel-off layer is lacking remain on the surface of the material whereto the label is to be stuck, and the other parts are peeled off the covering layer.

In accordance with the present invention, the adhesive force between the first peel-off layer and the breakable layer is larger than that between the second peel-off layer and the covering layer, and also the second peel-off layer is formed on the main surface of the breakable layer with a part thereof lacking, and therefore the adhesive force between the covering layer and the breakable layer differs between the part where the second peel-off layer is formed and the part where it is lacking, and when the surface member is peeled off, only the breakable layer of the part where the second peel-off layer is formed is peeled off the covering layer. Accordingly, the breakable layer is torn and separated from the other part and cannot adhere again in the original state, and therefore it can be detected that the breakable layer has been separated. According, any peel-off of the sticking material adhering can be detected at a glance, and also whether or not a toxic substance has been mixed into the package can be easily discerned. Furthermore, since the covering layer is formed on the whole surface of the adhesive layer, unlike the conventional cases, after the surface member is peeled off, the sticky surface of the adhesive layer is not exposed, and also no surface member can be stuck again by the adhesive force of the exposed adhesive layer.

These objects and other objects, features, aspects and advantages of the present invention will become more apparent from the following detailed description of the embodiments of the present invention when taken in conjunction with accompanying drawings.

DESCRIPTION OF THE PREFERRED EMBODIMENTS

Figure 1:
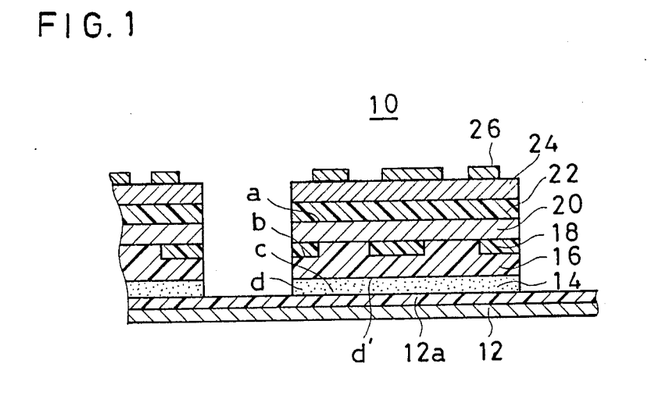
FIG. 1 is a cross-sectional view of a label of one embodiment in accordance with the present invention.

FIG. 1 is a cross-sectional view of a label which is one embodiment in accordance with the present invention.

The label 10 is stuck temporarily on a release sheet 12, being formed by laminating an adhesive layer 14, a covering layer 16, a second peel-off layer 18, a breakable layer 20, a first peel-off layer 22 and a surface layer 24 in sequence, and a printed layer 26 is formed on the surface of the above-mentioned surface layer 24.

The surface layer 24 is formed to prevent the breakable layer 20 from being cut or torn, being stuck temporarily on the breakable layer 20 through the first peel-off layer 22.

In addition, for the surface layer 24, materials which are relatively stiff and are unlikely to be contracted by heat such as polyester film and Nylon film, paper, synthetic paper and the like are enumerated, and as described later, in order that the trace of peeling-off can be seen well from the surface side of the surface layer 24, it is better to select a transparent or semi-transparent material. By doing so, it is easily found that a part of the breakable layer 20 remains on a material A whereon the label is stuck, and a part thereof is peeled off the material A wherein the label is stuck, and adheres to the surface layer 24, and thus this is convenient.

The first peel-off layer 22 sticks the surface layer 24 temporarily to the breakable layer 20 in a state wherein no re-sticking can be made and thereby makes peeling of the surface layer 24 off the breakable layer 20 easier, and is composed of a peel-off agent layer which is formed by coating a peel-off agent, for example, silicon resin, fluorine resin, paraffine, wax or the like, being formed between the surface layer 24 and the breakable layer 20.

The breakable layer 20 is composed of an metallizing film which is formed by vacuum-evaporating an evaporation substance such as aluminum, silver, zinc or the like, being a layer of breakable property which can be broken easily by the hand.

This breakable layer 20 may be formed, for example, of a printed layer wherein silver is directly printed in place of the metallizing film formed by the above-mentioned vacuum evaporation method, and besides a printed film by means of the UV type ink and other films coated with resins can also be enumerated. However, a relatively flexible material is preferably used such that the surface layer 24 does not cause a peel-off due to restoration to the original state against the adhesive force of this breakable layer 20 when this label 10 is stuck while bent to a bent part.

For other examples of the breakable layer 20, resin layers which can be cut or torn by applying a relatively weak force can be enumerated, for example, a resin layer which is formed by coating copolymer resin of vinyl chloride and acrylate wherein metal powder is mixed such as acrylate copolymer resin and the like.

The second peel-off layer 10 is formed by pattern-coating a peel-off agent such as silicon resin, fluorine resin, wax or the like on a part of the surface of the above-mentioned breakable layer 20. For example, a pattern such as characters, for example, "Already opened", a picture or the like is coated by printing, and as described later, the pattern such as the above-mentioned characters "Already opened" or the like appears when the surface layer 24 is peeled off and the breakable layer 20 is broken, and thereby a layer which is more conformable to the use purpose of the label 10 can be formed.

The covering layer 16, as described later, is a layer for covering the adhesive layer 14 to prevent the sticky adhesive layer 14 from being exposed on the surface when the surface layer 24 is peeled off. This covering layer 16 is formed, for example, by coating urethane resin, EVA resin, PVA, vinylacetochloride, acrylate or the like, or a resin of nitrocellulose-, polyamido- or acrylate-family on the surface of the breakable layer 20 where the second peel-off layer 18 is formed.

The adhesive layer 14 is for giving the label 10 an adhesive force for adhering to the material A whereto the label is to be stuck, and is composed, for example, of an adhesive layer formed by coating a pressure-sensitive adhesive, being formed on one main surface of the covering layer 16.

On the main surface of this adhesive layer 14, the release sheet 12 is stuck temporarily so as to protect the adhesive layer 14.

When the adhesive force between the first peel-off layer 22 and the breakable layer 20 is represeted as a, the adhesive force between the second peel-off layer and the covering layer 16 is represented as b, the adhesive force of the adhesive layer 14 is represented as d, the force required for separating the release sheet 12 of the adhesive layer 14 is represented as c, and the force required for breaking the breakable layer 20 is represented as e, this label 10 is constituted so as to meet the following expression.

$$c<b<e<a<d$$

Figure 9A:
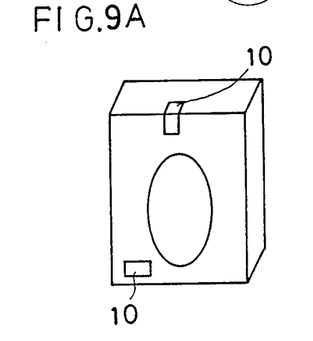
FIG. 9 is a perspective view showing a method of utilizing the above-mentioned embodiment.
Figures 9B, 9C:
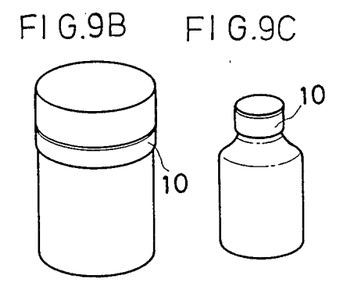

This label 10 is used in a manner that first the release sheet 12 is separated, and for example, as shown in FIG. 9A, 9B and 9C, it is stuck as a price tag or stuck on the opening part of a cake package, for example, by the adhesive layer 14.

Thus, in order to open the opening part of the package whereto the label 10 is stuck, the stuck label 10 has to be peeled off and then the sealed part be opened.

Figure 2:
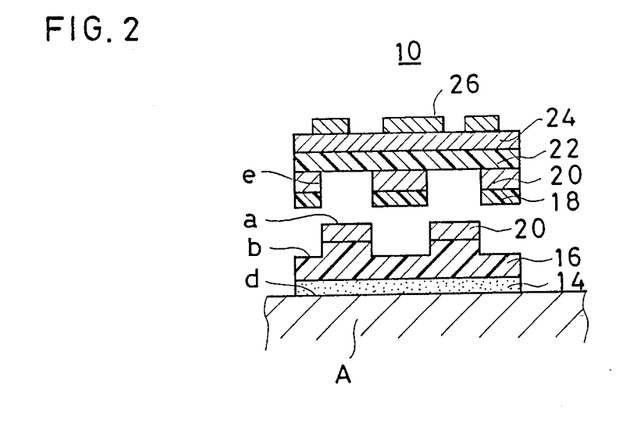
FIG. 2 is a cross-sectional view showing a state wherein the above-mentioned embodiment is broken.

In this case, the breakable layer 20 is stuck to the surface layer 24 through the first peel-off layer 22, and the breakable layer 20 adheres strongly to the covering layer 16, and at the portion where the second peel-off layer 18 is formed, the adhesive strength is weaker compared with that of the portion which adheres directly to the covering layer 16. Accordingly, as shown in FIG. 2, during the surface layer 24 is being peeled off, the breakable layer 20 is torn at the boundary part between the breakable layer 20 of the second peel-off layer 18 part and the breakable layer 20 of the part adhering directly to the covering layer 16, and also the main surface of the second peel-off layer 18 and the covering layer 16 are peeled off, and then a part of the breakable layer 20 (part where the second peel-off layer 18 is formed) is peeled off the material A wherein the label is stuck while adhering intact to the surface layer 24.

Then, the part where the second peel-off layer 18 is not formed of the breakable layer 20 remains intact while adhering to the material A whereto the label is to be stuck. Accordingly, once the surface layer 24 is peeled off, the breakable layer 20 is broken at the boundary between the part where the second peel-off layer 18 is formed and the part where it is not formed, and a state takes place that the surface layer 24 cannot be stuck again to the surface of the covering layer 16, and the original state cannot be restored, and therefore it can be clearly found at a glance to be the opened state.

In addition, in the present specification, an optimum example is enumerated in each case, and the sheet, film and equivalents thereof are generally represented as "sheet" or "film". Also, when called as "sheet", needless to say, it not only designates the leaf type, but also includes the roll (web) type.

Hereinafter, in order to further clarify embodiments in accordance with the pressure invention, further description is made based on one example of a method of manufacturing a sticking material relating to the present invention.

Figure 3:
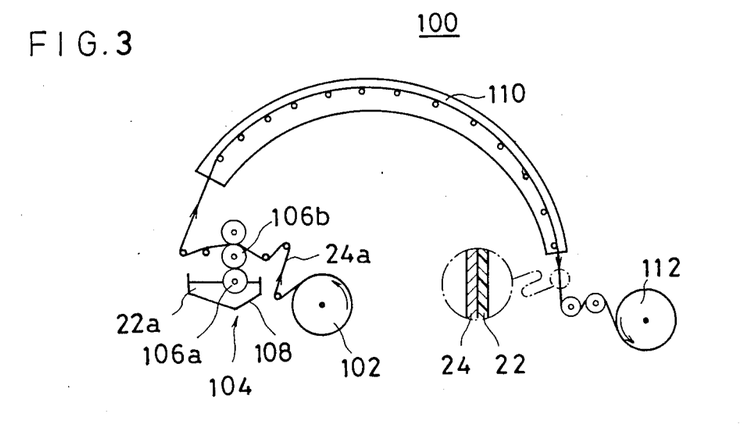
FIG. 3 through FIG. 5 are illustrative views showing one example of a apparatus for manufacturing a laminated sheet used for an embodiment in accordance with the present invention.
Figure 4:
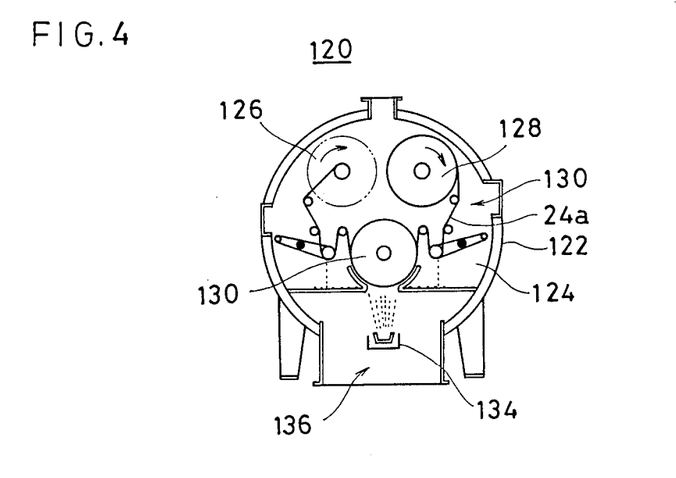
Figure 5:
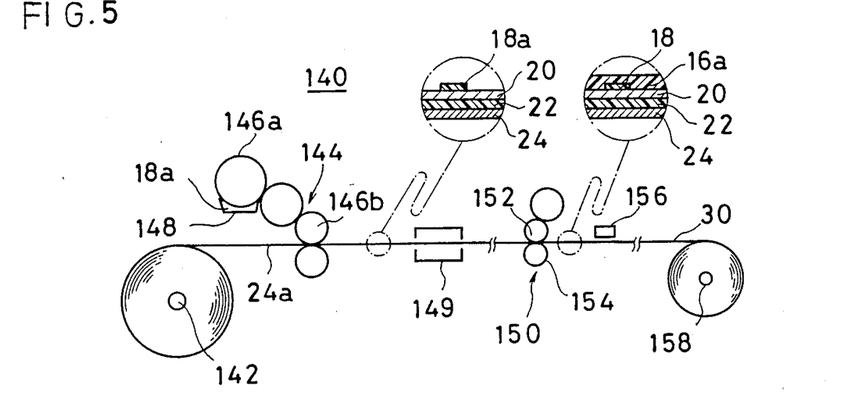

FIG. 3 through FIG. 5 are illustrative views showing one example of an apparatus for manufacturing a laminated sheet 30 used for an embodiment in accordance with the present invention.

This laminated sheet 30 is such that the first peel-off layer 22, the breakable layer 20, the second peel-off layer 18 and the covering layer 16 are laminated on the main surface of the surface layer 24 in this sequence.

An apparatus 100 comprises a holding roller 102 for holding a surface material 24a forming the band-shaped surface layer 24 in a roll shape. The surface material 24a held by the holding roller 102 is unrolled at one end thereof, being led to a peel-off agent coating apparatus 104.

The peel-off agent coating apparatus 10 is for printing (or coating) a peel-off agent 22a, for example, silicon resin, fluorine resin, paraffine, wax or the like on one surface of the surface material 24a, and comprises two rollers 106a and 106b and a reservoir 108, coating the peel-off agent 22a while rotating the rollers 106a and 106b. In addition, for the peel-off agent coating apparatus 104, a coating apparatus such as the gravure roll coater, the reverse roll coater or the like may be employed, and also a publicly known printer such as the offset printer, the screen printer or the like may be employed.

This peel-off agent 22a is led to a drier 110 comprising a heater which is installed next, and is dried. In the drier 110, the peel-off agent 22a which is printed (or coated, on the surface material 24a is dried, being formed as the first peel-off layer 22.

Thus, the surface material 24a whereon the first peel-off layer 22 is formed is led to a take-up apparatus 112.

Subsequently, the surface material 24a whereon the peel-off agent 22a is thus coated is fed to a laminating apparatus 120 which forms the breakable layer 20. For this laminating apparatus 120, for example, a semicontinuous type vacuum evaporation apparatus of a structure employing both the batch system and the continuous take-up system is enumerated. The structure of this apparatus, when roughly classified from functions, comprises a vacuum tank 122, an internal apparatus provided with a take-up shaft 126, a feed-out shaft 128 and a cooling drum 130 in an upper chamber 124, an evaporation source 134 and a heating apparatus in a lower chamber 132, a vacuum exhausting system 136 and other various meters.

By means of this semi-continuous type vacuum evaporation apparatus, the surface material 24a sent out from the feed-out shaft 128 passes through the cooling drum 130 and a slit and is led to the lower chamber 132, being vacuum evaporated to form the breakable layer 20 on the main surface of the first peel-off layer 22 formed on the surface of the surface material 24a with aluminum, silver, zinc or other metal or metal compound used for an evaporation material. In addition, the surface material 24a returns again to the upper chamber 124 after evaporation, being taken up on the take-up shaft 126.

Figure 8:
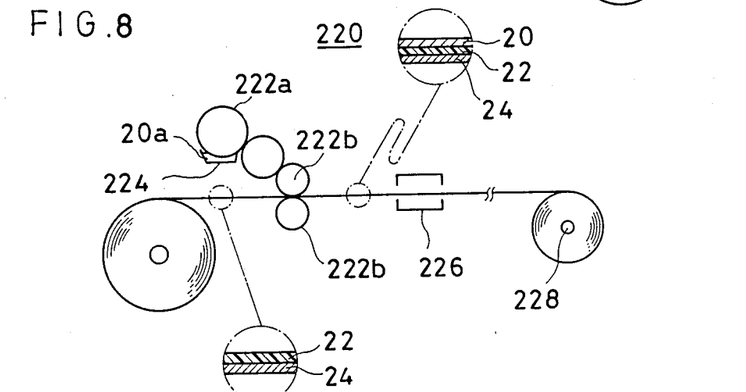
FIG. 8 is an illustrative view showing another method for forming a breakable layer.

For other examples of this laminating apparatus, for example, a printing apparatus such as the offset printer and a coating apparatus as shown in FIG. 8 are enumerated.

A laminating apparatus 220 as illustrated in FIG. 8 is for print-coating a breakable material 20a forming the breakable layer 20 on the surface of the first peel-off layer 22 formed on the surface of the surface layer 24, comprising a main roller 222a and a roller 222b which is installed opposite to this main roller 222a. Then, the lower part of the main roller 222a is immersed into the breakable material 20a stored in a reservoir 224, and the breakable material 20a is printed (or coated) by the roller 222b on the surface of the first peel-off layer 22 of the surface material 24a pinched by the rollers 222b and 222b. For this breakable material 20a, as is mentioned above, inks such as the UV type ink and the like, and resins such as synthetic resin containing metal powder and the like are enumerated.

Then, the surface material 24a whereon the breakable material 20a is printed (or coated) is led, for example, to a drier 226 comprising a heater. In the drier 226, the breakable material 20a print-coated on the surface material 24a is dried to be formed as the breakable layer 20, thereafter being taken up on a take-up roller 228. A lap of the surface layer 24 whereon this breakable layer 20 is formed is fed to a laminating apparatus 140 as shown in FIG. 5.

The laminating apparatus 140 as shown in FIG. 5 comprises an apparatus 142 wherein the lap of this surface layer 24 is loaded. The surface layer 24 drawn out from the lap loading apparatus 142 loading this lap is led to the next peel-off agent coating apparatus 144. The peel-off agent coating apparatus 144 is for printed (or coated) a peel-off agent 18a, for example, silicon resin, fluorine resin, paraffine, wax or the like on one surface of the breakable layer 20, and comprises two rollers 146a and 146b and a reservoir 148, coating the peel-off agent 18a while rotating the rollers 146a and 146b. This peel-off agent 18a is led to a drier 149 comprising a heater which is installed next, being dried. In addition, for the peel-off agent coating apparatus 144, a coating apparatus such as the gravure roll coater, the reverse roll coater or the like may be employed, and also a publicly known printer such as the offset printer, the screen printer or the like may be employed.

This peel-off agent 18a which forms the second peel-off layer 18 is printed (or coated) partly on the surface of the breakable layer 20, and the layer 18 is formed, for example, by printing a pattern such as "Already opened" or the like. The surface layer 24 whereon the peel-off agent 18a is coated is fed to the next laminate apparatus 150 which laminates a covering material 16a forming the covering layer 16.

This laminating apparatus 150 for the covering material comprises a roller 152 which coats the covering material 16a such as the EVA resin or the like. In this laminating apparatus 150, coating is performed while pressing by a roller 154 to laminate the covering material 16a on the surface of the breakable layer 20 whereon the peel-off agent 18a forming the second peel-off layer 18 has been coated, and the surface layer 24 is fed to a cooler 156 installed next in a melted state.

The cooler 156 is for cooling the covering material 16a. In the cooler 156, the covering material 16a is cooled to be solidified, being formed as the covering layer 16, and on the main surface of the surface layer 24, the laminated sheet 30 is formed wherein the first peel-off layer 22, the breakable layer 20, the second peel-off layer 18 and the covering layer 16 are laminated in sequence. This laminated sheet 30 is taken up on a take-up roller 158.

Figure 6:
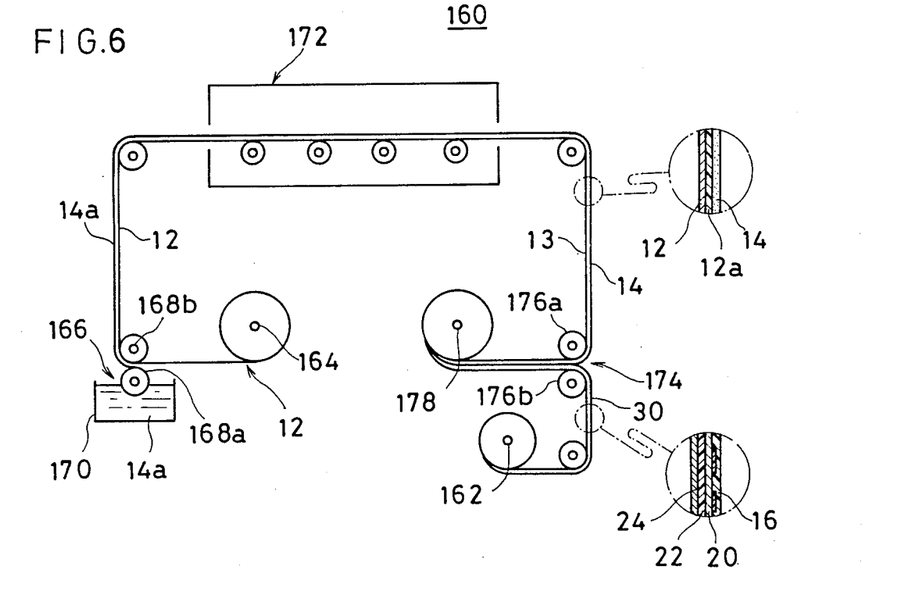
FIG. 6 is an illustrative view showing one example of an apparatus for manufacturing a laminated material used for an embodiment in accordance with the present invention.

The laminated sheet 30 thus formed is loaded next in a laminating apparatus 160 as shown in FIG. 6.

FIG. 6 is an illustrative view showing the laminating apparatus which laminates the adhesive layer 14 on the laminated sheet 30.

This laminating apparatus 160 comprises a lap loading apparatus 162 loading a lap of the laminated sheet 30 and a lap loading apparatus 164 loading a lap of the release sheet 12.

The release sheet 12 drawn out from this lap loading apparatus 164 for the release sheet 12 is led to an adhesive coating apparatus 166 which is a coating apparatus for the adhesive 14 with the surface of the peel-off agent layer 12a set as the bottom surface FIG. 6. In this adhesive coating apparatus 166, an adhesive such as the pressure-sensitive type adhesive or the like is printed (or coated).

This adhesive coating apparatus 166 is for coating an adhesive 14a on a peel-off agent layer 12a of the release sheet 12, comprising a main roller 168a and a roller 168b which is installed opposite to this main roller 168a. Then, the lower part of the main roller 168a is immersed into the adhesive 14a stored in a reservoir 170, and the adhesive 14a is printed (or coated) by the main roller 168a on the surface of the peel-off agent layer 12a of the release sheet 12 which is pinched by the main roller 168a and the roller 168b.

Then, the release sheet 12 whereon the adhesive 14a is printed (or coated) is led to a drier 172 comprising, for example, a heater. In the drier 172, the adhesive 14a printed (or coated) on the release sheet 12 is dried to be formed as the adhesive layer 14, and a lamination of the adhesive layer 14 and the release sheet 12 is led to a laminating apparatus 174 for the laminated sheet 30 prepared separately. This laminating apparatus 174 for the laminated sheet 30 comprises the lap loading apparatus 162 which loads a lap of the laminated sheet 30. The laminated sheet 30 led out from this lap loading apparatus 162 is led between two rollers 176a and 176b, and the surface of the above-mentioned adhesive layer 14 formed on the surface of the release sheet 12 and the covering layer 16 side surface of the laminated sheet 30 are superposed, and are laminated by the pressure of the two rollers 176a and 176b and the adhesive force of the adhesive layer 14, being taken up on a roller 178 in a laminated state.

In order to make a label with the sticking material thus manufactured, the laminated sheet has only to be loaded in an apparatus for manufacturing a label comprising a printing apparatus for this laminated sheet and the like.

Figure 7:
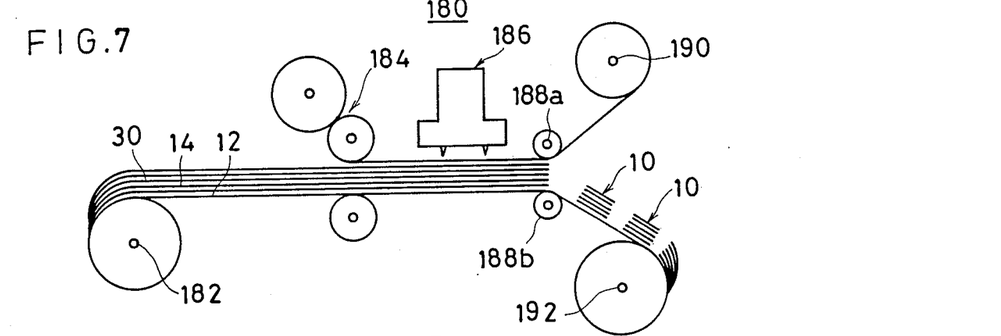
FIG. 7 is an illustrative view showing one example of an apparatus for manufacturing a label.

FIG. 7 is an illustrative view showing one example of an apparatus for manufacturing a label.

Such a label manufacturing apparatus 180 comprises a holding apparatus 182 which loads a lap of the laminated sheet 30 wherein the peel-off sheet 12 is laminated on the surface of the adhesive layer 14. A laminated sheet composed of the release sheet 12 drawn out from this holding apparatus 182 and the laminated sheet 30 is led to a printing apparatus 184. This printing apparatus 184 is composed, for example, of a publicly known printer such as the offset printer or the like. Then, by this printing apparatus 184, the printed layer 26 whereon a pattern, for example, "trade name" or the like is printed is formed on the surface of the surface layer 24. The laminated sheet whereon the printed layer 26 is formed as described above is led to a punching machine 186. The punching machine 186 comprises a so-called die cutter having a cutting edge, and properly shaped cuts are formed on the surface layer 24, the first peel-off layer 22, the breakable layer 20, the covering layer 16 and the adhesive layer 14 by means of this die cutter.

In addition, the punching machine 186 may employ a roll with cutting edge, so-called die roll also.

The laminated sheet whereon cuts are formed is divided into a useless part and the label 10 (required part) by rollers 188a and 188b, and the useless part is taken up in a roll shape by a stripper roller 190, and the label (required part) is taken up in a roll shape by a take-up roller 192 in the state wherein it is stuck temporarily on the release sheet 12. In addition, a cuts forming machine may be installed in place of the punching machine 186 and the take-up roller 192. This cuts forming machine comprises a cutting edge. Thus cutting edge is for forming cuts on the surface layer 24, the first peel-off layer 22, the breakable layer 20, the covering layer 16 and the adhesive layer 14 to make each label piece 10.

Here, further specific description is made as follows:

(1) Polyethylene terephthalate film of about $50\mu$ in thickness is used for the surface layer, and a silicon resin is coated on one main surface thereof to form the first peel-off layer, and subsequently in order to form the breakable layer, aluminum is vacuum-evaporated on this first peel-off layer to from the breakable layer of about $7\mu$ in thickness.

Furthermore, the silicon resin manufactured by Toray Industries, Inc. whose peeling force is smaller than that of the silicon resin forming the above-mentioned peel-off layer is partly coated on this surface of the breakable layer formed by evaporating aluminum so that the dried coated film thickness is 0.1–5μ to form the second peel-off layer.

A covering layer is formed on this layer by coating a synthetic resin whose main component is the EVA resin contained in the following Table 1 by a thickness of about 5–50μ. Thereafter, the adhesive layer is formed by coating the acrylate adhesive (BPS-5127) manufactured by Toyo Ink Mfg. Co. Ltd. so that the dried coated film thickness is 5–50μ. In this case, the adhesive force (a) between the first peel-off layer and the breakable layer is about 50 g, the adhesive force (b) between the second peel-off layer and the covering layer is about 30 g, the adhesive force (d) of the adhesive layer is about 1,000 g, and the force (c) required for separating the release sheet off the adhesive layer is about 20 g.

The pressure-sensitive adhesive material thus constituted was made into a label piece, which was stuck to a material whereto the label is to be stuck (paper box or the like).

The adhesive force (d) to the material whereto the label is to be stuck and the adhesive force (d') between the covering layer and the adhesive layer are about 1,000 g, respectively.

When the stuck label piece was peeled forcedly off the material whereto the label was stuck, the breakable layer was torn at the boundary between the part where the second peel-off layer is formed and the part where it is not formed, and the torn breakable layer was peeled together with the surface layer off the material whereto the label was stuck at the second peel-off layer portion.

|  | Components | Composition |
|---|---|---|
| Ethylene vinyl acetate co-polymer resin | Vinylacetate content 10~50% Melt index (MI) 5~500 Molecular weight 10,000~100,000 | 20~50 |
| Adhesion-dative resin | Rosin Hydrogenerated rosin Glycerine resin Polyturpentine resin Turpentine phenol resin G5 group petroleum resin G9 group petroleum resin Alicyclic group hydro-generated petroleum resin | 20~60 (0~60) |
|  | Paraffin wax Micro wax Polyethylene wax Polypropylene wax Paraffine group, Naphthene group resin | 5~50 (5~70) |
| Heat stabilizer Aging preventing agent |  | 0~1.5 |

Remark:
In place of ethylene vinyl acetate copolymer resin, SIS SBS, polyisobutylene or polybutane may be used.

(2) Polyester film of about 50μ in thickness is used for the surface layer, and silicon resin is coated on one main surface thereof to form the first peel-off layer, and subsequently to form the breakable layer, the printed layer is formed on this first peel-off layer by the UV ink, and thereby the breakable layer of about 7μ in thickness is formed.

Furthermore, the second peel-off layer is formed by partly coating the silicon resin manufactured by Toray Industries, Inc. whose peeling force is smaller than that of the silicon resin forming the above-mentioned first peel-off layer on the surface of the breakable layer composed of this printed layer so that the dried film thickness is 0.1–5μ.

On this layer, a synthetic resin whose main component is the EVA resin is coated by a thickness of about 5–50μ to form the covering layer. Thereafter, the acrylate adhesive (BPS-5127) manufactured by Toyo Ink Mfg. Co. Ltd. is coated so that the dried coated film thickness is 5–50μ to form the adhesive layer.

In this case, the adhesive force (a) between the first peel-off layer and the breakable layer is about 50 g, the adhesive force (b) between the second peel-off layer and the covering layer is about 30 g, the adhesive force (d) of the adhesive layer is about 1,000 g and the force (c) required for peeling the release sheet off the adhesive layer is about 20 g.

The pressure-sensitive adhesive material thus constituted was made into a label piece, and was stuck to the material whereto the label is to be stuck (paper box or the like).

The adhesive force (d) to the material whereto the label is to be stuck and the adhesive force (d') between the covering layer and the adhesive layer in this case are about 1,000 g, respectively.

When the stuck label piece was peeled forcedly off the material whereto the label was stuck, the breakable layer was torn at the boundary between the part where the second peel-off layer is formed and the part where it is not formed, and the torn breakable layer was peeled together with the surface layer off the material whereto the label was stuck.

Figure 10:
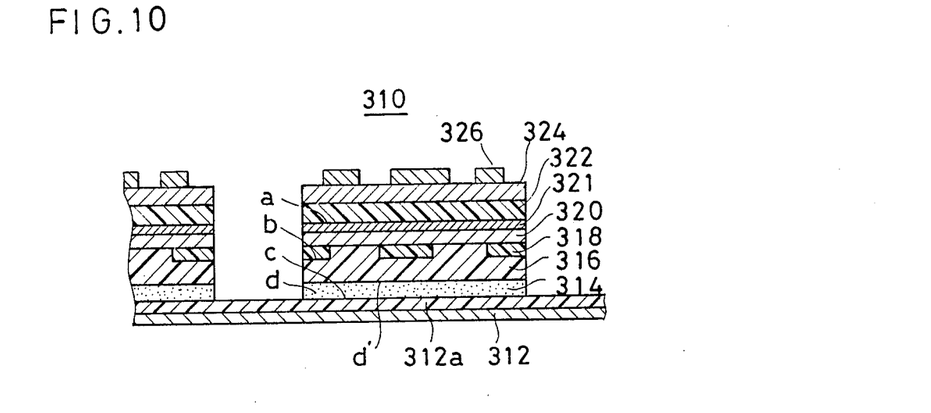
FIG. 10 is a cross-sectional view of a label which is one embodiment in accordance with the present invention.

FIG. 10 is a cross-sectional view of a label which is another embodiment in accordance with the present invention.

This label 310 is stuck temporarily on a release sheet 312, wherein an adhesive layer 314, a covering layer 316, a second peel-off-layer 318, a breakable layer 320, a temporarily stuck layer 321, a first peel-off layer 322 and a surface layer 324 are laminated in sequence, and a printed layer 326 is formed on the surace of the above-mentioned surface layer 324.

For the breakable layer 320, breakable sheets which can be broken easily by the hand are enumerated such as aluminum foil and synthetic resin films which are represented by a brittle film made of a mixture of copolymer resin of vinyl chloride and acrylate and a constitution pigment (for example, titanium white or calcium carbonate).

Also, among them, a relatively flexible sheet is preferable such that the surface layer 324 does not cause a peel-off due to restoration to the original state against the adhesive force of this temporarily stuck layer 321 when this label 310 is bent and stuck to a bend part.

The temporarily stuck layer 321 is a layer which sticks the breakable layer 320 to the surface layer 324, and this temporarily stuck layer 321 is formed by coating a biliquid-reaction polymer resin, for example, urethane resin, the EVA resin, or a resin of PVA, vinylacetochloride or acrylate.

In addition, for other examples of the temporarily stuck layer 321, adhesive layers are enumerated whereon a heat-hardening adhesive of polyester family, polyurethane family or the like are coated.

In order to open the opening part of the package whereto this label 310 is stuck, the stuck label 310 is required to be peeled off and then the sealed part is opened.

Figure 11:
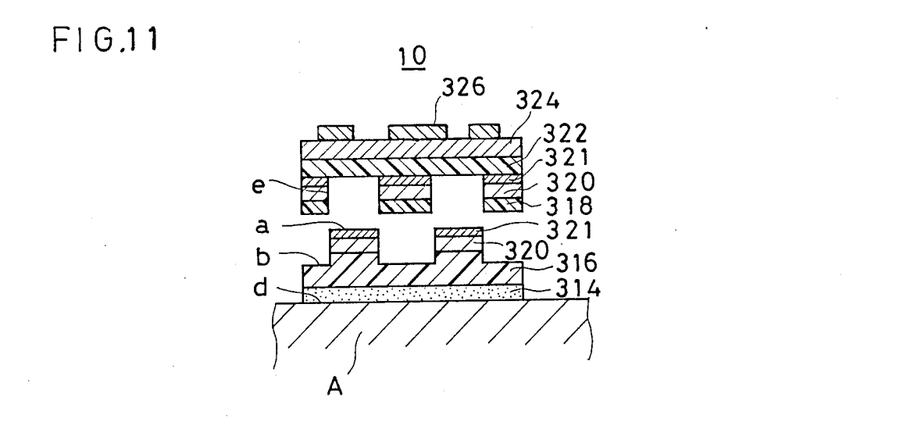
FIG. 11 is a cross-sectional view showing a state wherein the above-mentioned embodiment is broken.

In this case, the breakable layer 320 is stuck temporarily to the surface layer 324 through the first peel-off layer 322, and the breakable layer 320 adheres strongly to the covering layer 316, and adhesion at the portion where the second peel-off layer 318 is formed is weaker compared with that at the portion where adhesion is not made directly to the covering layer 316. Accordingly, as shown in FIG. 11, when the surface layer 324 is peeled off, the breakable layer 320 is torn at the boundary between the breakable layer 320 of the second peel-off layer 318 part and the breakable layer 320 of the part whereto the covering layer 316 adheres directly, and also the covering layer 316 is peeled off the main surface of the second peel-off layer 318, and a part of the breakable layer 320 (part where the second peel-off layer 318 is formed) is peeled off the material A whereeto the label is stuck, while adhering intact to the surface layer 324.

Then, in the breakable layer 320, the part where the second peel-off layer 318 is not formed remains intact while adhering to the material A whereto the label is to be stuck. Accordingly, once the surface layer 324 is peeled off, the breakable layer 320 is broken at the boundary between the part where the second peel-off layer 318 is formed and the part where it is not formed, and a state takes place wherein the surface layer 324 cannot be stuck again on the surface of the covering layer 316, and no original state can be restored, and therefore the opened state can be clearly found at a glance.

Hereinafter, to more clarify an embodiment in accordance with the present invention, further description is made based on one example of a method of manufacturing a sticking material in accordance with the present invention.

Figure 12:
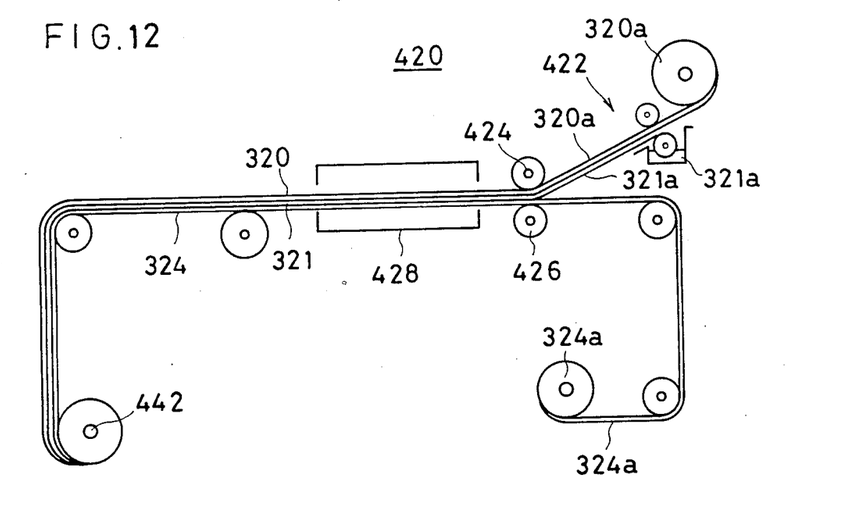
FIG. 12 is an illustrative view showing one example of an apparatus for manufacturing a laminated sheet used for an embodiment in accordance with the present invention.

FIG. 12 is an illustrative view showing one example of an apparatus for manufacturing a laminated sheet 330 used for an embodiment in accordance with the present invention.

This laminated sheet 330 is such that the first peel-off layer 322, the breakable layer 320, the second peel-off layer 318 and the covering layer 316 are laminated in this sequence.

A surface material 324a whereon a peel-off agent 322a is coated, which is described in the above-mentioned embodiment, is fed to a laminating apparatus 420 which forms the breakable layer 320. This laminating apparatus 420 comprises an apparatus which loads a lap that the surface material 324a is lapped. An aluminum foil 320a drawn out from this lap, which is a breakable material forming the breakable layer 320, is led to a coating apparatus 422 comprising two rollers and a pan for storing a resin or adhesive 321a forming the temporarily stuck layer 321, and the resin or adhesive 321a is coated on the surface of the aluminum foil 320a attending on rotation of the two rollers, and thereafter the foil is further led between other two rollers 424 and 426, and the aluminum foil 320a is superposed on and is made to adhere by the adhesive 321a on the surface thereof to the surface of the first peel-off layer 322 of the surface material 324a which is led separately. Then it is led to an adhesion apparatus 428. For the adhesion apparatus 428, a "drier" is employed in the case where an adhesive comprising an aquaresin of PVA family, vinylacetate family, acrylate family or the like or a solvent type adhesive composed of vinyl-acetochloride, urethane, acrylate or the like is used as the adhesive 321a, and a "cooler" is employed in the case where a hotmelt type adhesive of rubber family or EVA family is used.

Figure 13:
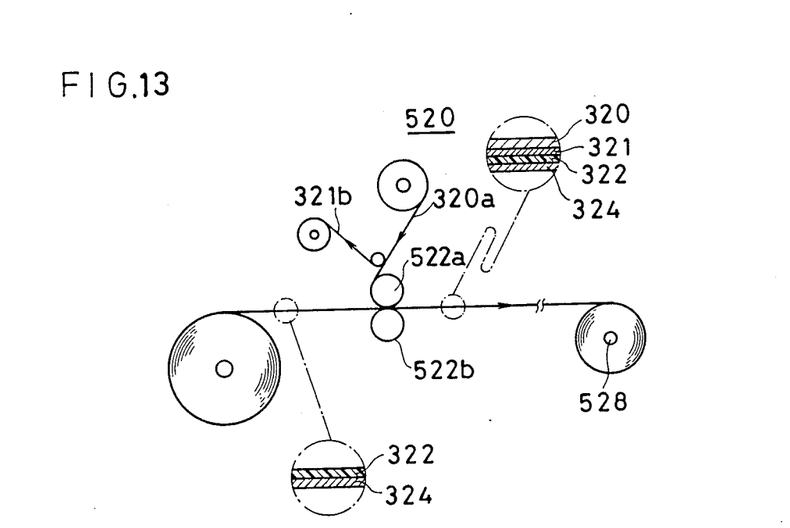
FIG. 13 is an illustrative view showing still another method for forming a breakable layer.

A laminating apparatus as illustrated in FIG. 13 may be employed in place of this laminating apparatus as illustrated in FIG. 12.

A laminating apparatus 520 as illustrated in FIG. 13 is for superposing and making adhere the breakable material 320a forming the breakable layer 320 to the surface of the first peel-off layer 322 formed on the surface of the surface layer 324, comprising a main roller 522a and a roller 522b installed opposite to the main roller 522a. Then, the breakable material 320a composed of a brittle film is fed between the main roller 522a and the roller 522b. On the back surface of this breakable material 320a, the temporarily stuck layer 321 whereon a pressure-sensitive adhesive or the like is coated in advance is formed, and furthermore on the surface of the temporarily stuck layer 321, a peel off material 321b is temporarily stuck so that the temporarily stuck layer 321 does not adhere to the surface of the breakable material 320a. Then, this laminated sheet of the breakable material 320a, the temporarily stuck layer 321 and the peel-off material 321b is lapped and before the laminated sheet drawn out from this lap is fed to the main roller 522a and the roller 522b, only the peel-off material 321b is peeled off the temporarily stuck layer 321, and the temporarily stuck layer 321 is exposed, and thus the laminated sheet is fed to the main roller 522a and the roller 522b in this state, being laminated and made to adhere to the surface of the first peel-off layer 322 of the surface material 324a. Thus, the breakable layer 320 is formed, thereafter being taken up on a take-up roller 528.

This lap of the surface layer 324 whereon the breakable layer 320 is formed is fed to the laminating apparatus 140 as shown in FIG. 5 likewise the case of the above-mentioned embodiment.

Here, further specific description is made as follows on this embodiment.

(1) A polyethylene terephthalate film of about $50\mu$ in thickness is used for the surface layer, and a silicon resin is coated on one main surface thereof to form the first peel-off layer, and subsequently to form the breakable layer, an aluminum foil is temporarily stuck on this first peel-off layer using an adhesive to form the breakable layer of about $7\mu$ in thickness.

Furthermore, the silicon resin manufactured by Toray Industries, Inc. whose peeling force is smaller than that of the silicon resin forming the above-mentioned first peel-off layer is coated partly on the surface of this breakable layer composed of the aluminum foil to form the second peel-off layer.

On this layer, the synthetic resin whose main component is the EVA resin contained in the above-mentioned Table 1 is coated by a thickness of about $5-50\mu$ to form the covering layer. Thereafter, the acrylate adhesive (BPS-5127) manufactured by TOYO Ink. Co. is coated so that the dried coated film thickness is $5-50\mu$ to form the adhesive layer. In this case, the adhesive force (a) between the first peel-off layer and the breakable layer is about 50 g, the adhesive force (b) between the second peel-off layer and the covering layer is about 30 g, the adhesive force (d) of the adhesive layer is about 1,000 g and the force (c) required for peeling the release sheet off the adhesive layer is about 20 g.

The adhesive force (d) to the material whereto the label is to be stuck and the adhesive force (d') between the coated film layer and the adhesive layer in this case are about 1,000 g, respectively.

When the stuck label piece was peeled forcedly off the material whereto the label was stuck, the breakable layer was torn at the boundary between the part where the second peel-off layer is formed and the part where it is not formed, and the torn breakable layer was peeled together with the surface layer off the material whereto the label was stuck at the second peel-off layer portion.

(2) A polyester film of about 50μ in thickness is used for the surface layer, and a silicon resin is coated on one main surface thereof to form the first peel-off layer, and subsequently to form the breakable layer, a so-called brittle film is temporarily stuck with an adhesive, and then the breakable layer of about 7μ in thickness is formed.

Furthermore, the silicon resin manufactured by Toray Inc. whose peeling force is smaller than that of the above-mentioned silicon resin forming the first peel-off layer is coated partly on the surface of the breakable layer composed of this brittle film so that the dried coated film thickness is 0.1–5μ, and thereby the second peel-off layer is formed.

On this layer, a synthetic resin whose main component is the EVA resin is coated by a thickness of about 5–50μ to form the covering layer. Thereafter, the acrylate adhesive (BPS-5127) manufactured by Toyo Ink Mfg. Co., Ltd. is coated so that the dried coated film thickness is 5–50μ to form the adhesive layer. In this case, the adhesive force (a) between the first peel-off layer and the breakable layer is about 50 g, the adhesive force (b) between the second peel-off layer and the covering layer is about 30 g, the adhesive force (d) of the adhesive layer is about 1,000 g, and the force (c) required for peeling the release sheet off the adhesive layer is about 20 g.

The pressure-sensitive sticking material thus constituted was made into a label piece, and was stuck to the material whereto the label is to be stuck (paper box of the like).

The adhesive force (d) to the material whereto the label is to be stuck and the adhesive force (d') between the covering layer and the adhesive layer are about 1,000 g respectively.

When the stuck label piece was peeled forcedly off the material whereto the label was stuck, the breakable layer was torn at the boundary between the part where the second peel-off layer is formed and the part where it is not formed, and the torn breakable layer was peeled together with the surface layer off the material whereto the label was stuck.

What is claimed is:

1. An easily breakable sticking material which comprises a surface layer having an upper surface and a lower surface,
    a first peel off layer located on said lower surface of said lower surface layer and having an upper surface and a lower surface,
    a breakable layer laminated on said lower surface of said first peel-off layer and having an upper surface and a lower surface,
    a second peel-off layer formed on a portion of said lower surface of said breakable layer and having an upper surface and a lower surface,
    a covering layer formed on said lower surface of said second peel-off layer and on a portion of said lower surface of said breakable layer and having an upper surface and a lower surface,
    an adhesive layer formed on the lower surface of said covering layer,
    said breakable layer is formed of a material which is relatively easily breakable compared with that of said surface layer and said covering layer so that the breakable layer is readily breakable,
    a first adhesive having an adhesive force "a" between said first peel-off layer and said breakable layer, and a second adhesive having an adhesive force "b" between said second peel-off layer and said covering layer with "a">"b".

2. An easily breakable sticking material in accordance with claim 1, wherein said surface layer is made of a synthetic resin film.

3. An easily breakable sticking material in accordance with claim 2, wherein said surface layer is made of a transparent synthetic resin film.

4. An easily sticking material in accordance with claim 2, wherein said surface layer is made of a polyethylene film.

5. An easily breakable sticking material in accordance with claim 1, wherein the first peel-off layer is made of a peel-off agent layer which is formed by coating silicon resin.

6. An easily breakable sticking material in accordance with claim 1, wherein the first peel-off layer is made of a peel-off agent layer which is formed by coating fluorine resin.

7. An easily breakable sticking material in accordance with claim 1, wherein said breakable layer is made of an evaporation layer.

8. An easily breakable sticking material in accordance with claim 7, wherein said evaporation layer is made of a metal evaporation layer.

9. An easily breakable sticking material in accordance with claim 8, wherein said metal evaporation layer is formed by evaporating aluminum.

10. An easily breakable sticking material in accordance with claim 8, wherein said metal evaporation layer is formed by evaporating silver.

11. An easily breakable sticking material in accordance with claim 1, wherein said breakable layer is made of a printed layer.

12. An easily breakable sticking material in accordance with claim 11, wherein said breakable layer is made of a silver-printed layer.

13. An easily breakable sticking material in accordance with claim 1, wherein said breakable layer is constituted with a metal foil layer.

14. An easily breakable sticking material in accordance with claim 13, wherein said metal foil layer is made of an aluminum foil layer.

15. An easily breakable sticking material in accordance with claim 1, wherein said breakable layer is made of a brittle film layer.

16. An easily breakable sticking material in accordance with claim 13, wherein layer means is provided to temporarily adhere said breakable layer to said surface layer.

17. An easily breakable sticking material in accordance with claim 16, wherein said layer means includes an adhesive agent layer.

18. An easily breakable sticking material in accordance with claim 16, wherein said layer means is made of a synthetic resin coating.

19. An easily breakable sticking material in accordance with claim 1, wherein said second peel-off layer is made of a peel-off agent layer which is formed of a silicon resin coating.

20. An easily breakable sticking material in accordance with claim 1, wherein said second peel-off layer is made of a peel-off agent layer which is formed of a fluorine resin coating.

21. An easily breakable sticking material in accordance with claim 1, wherein said covering layer is made of a resin layer which is formed of a synthetic resin coating.

22. An easily breakable sticking material in accordance with claim 1, wherein said covering layer is made of a resin layer which is formed of an EVA resin coating.

23. An easily breakable sticking material in accordance with claim 1, wherein said adhesive layer is made of a pressure-sensitive adhesive layer.

* * * * *